United States Patent
Goetting et al.

(10) Patent No.: US 11,711,046 B2
(45) Date of Patent: Jul. 25, 2023

(54) METHOD FOR OPERATING AN ELECTRIC MACHINE

(71) Applicant: Robert Bosch GmbH, Stuttgart (DE)

(72) Inventors: Gunther Goetting, Stuttgart (DE); Thomas Wenzler, Hockenheim (DE)

(73) Assignee: Robert Bosch GmbH, Stuttgart (DE)

( * ) Notice: Subject to any disclaimer, the term of this patent is extended or adjusted under 35 U.S.C. 154(b) by 184 days.

(21) Appl. No.: 17/312,692

(22) PCT Filed: Nov. 6, 2019

(86) PCT No.: PCT/EP2019/080389
§ 371 (c)(1),
(2) Date: Jun. 10, 2021

(87) PCT Pub. No.: WO2020/120036
PCT Pub. Date: Jun. 18, 2020

(65) Prior Publication Data
US 2022/0069761 A1    Mar. 3, 2022

(30) Foreign Application Priority Data

Dec. 12, 2018 (DE) ...................... 10 2018 221 491.3

(51) Int. Cl.
*H02P 29/68* (2016.01)
(52) U.S. Cl.
CPC .......... *H02P 29/68* (2016.02); *H02P 2207/05* (2013.01)
(58) Field of Classification Search
CPC .... H02P 29/68; H02P 2207/05; H02P 29/032; H02P 29/60
(Continued)

(56) References Cited

U.S. PATENT DOCUMENTS

| 7,915,844 B2 * | 3/2011 | Kurosawa ................. H02P 6/18 318/400.4 |
| 8,680,799 B2 * | 3/2014 | Rote ....................... H02P 6/157 318/400.14 |

FOREIGN PATENT DOCUMENTS

| DE | 102012103022 A1 | 10/2013 |
| DE | 102013201344 A1 | 7/2014 |

(Continued)

OTHER PUBLICATIONS

Translation of International Search Report for Application No. PCT/EP2019/080389 dated Feb. 12, 2020 (2 pages).

*Primary Examiner* — David Luo
(74) *Attorney, Agent, or Firm* — Michael Best & Friedrich LLP

(57) ABSTRACT

The invention relates to a method for operating an electric machine (6), and to a control device (10) that is configured to carry out the method. The method comprises a normal mode ($\psi_{normal}$) and a special mode ($\psi_{special}$) in dependence on a preset target value ($M_{target}$), wherein the normal mode ($\psi_{normal}$) comprises the steps of detecting an operating state, wherein, in the event that the detected operating state is a special state, the special mode ($\psi_{special}$) is carried out. The special mode ($\psi_{special}$) comprises the steps of modulating a cyclic value ($M_{cycl}$) on the present target value ($M_{target}$) and detecting the operating state, wherein, in the event that the operating state is a normal state, the normal mode ($\psi_{normal}$) is carried out.

13 Claims, 2 Drawing Sheets

(58) Field of Classification Search
USPC .......................................... 318/472, 471, 445
See application file for complete search history.

(56) References Cited

FOREIGN PATENT DOCUMENTS

| | | |
|---|---|---|
| DE | 102016220536 A1 | 4/2018 |
| DE | 102017203656 A1 | 9/2018 |
| WO | 2014001028 A1 | 1/2014 |

* cited by examiner

METHOD FOR OPERATING AN ELECTRIC MACHINE

BACKGROUND OF THE INVENTION

The present invention relates to a method for operating an electric machine and a closed-loop control device for performing such a method.

Electric machines, such as, for example, permanent-magnet synchronous machines, are used in numerous technical fields. For example, such permanent-magnet synchronous machines are used in motor vehicles, in particular electric and hybrid vehicles, but also in small drives in the 12V or 48V range.

WO 2014/001028 A1 discloses a method for operating an electric traction drive system and an associated control apparatus.

The background of the invention consists in that the loaded switch branch quickly reaches a maximum temperature in the case of electric drives with uneven loading of the switch branches at a high electrically generated torque and when the drive machine is at a standstill at the same time. In order to avoid overheating and therefore destruction of the power electronics, the electric machine is regulated so that the torque available by the electric machine is considerably reduced.

An object of the present invention therefore consists in providing a method and a device with which the full torque of the electric machine is still usable, and destruction of the power electronics does not take place.

SUMMARY OF THE INVENTION

The object is achieved by a method for operating an electric machine and a device for performing such a method according to the invention. The respectively back-referenced dependent claims reveal advantageous developments of the invention.

The method according to the invention comprises a normal operating mode and a special operating mode depending on a preset setpoint value, wherein the normal operating mode comprises the steps of detecting an operating state, wherein for the case where the detected operating state is a special state, the special operating mode is implemented, and wherein the special operating mode comprises the steps of modulating a cyclical value onto the preset setpoint value, detecting the operating state, wherein for the case where the operating state is a normal state, the normal operating mode is implemented.

Within the meaning of the invention, operating state is understood to mean the state variables describing a system such as, for example, the frequency, impressed by the inverter, of the voltage, the rotational frequency of the electric machine, temperature or torque, with the result that a decision can be made as to whether these variables are outside a defined range, and therefore a special state or a normal state can be established. A normal state is in this case understood to mean any operating state which does not fall under the special state.

Within the meaning of the invention, a cyclical value is understood to mean a periodically changing value in the form of, for example, a sinusoidal oscillation, saw-tooth oscillation etc., which causes an oscillation about the setpoint value.

This method has the advantage that individual component parts are not excessively subjected to thermal loading as a result of the cyclical movement of the rotor and thereby destroyed. The thermal loading of individual component parts can thus be reduced. As a result, a regulation of the electric machine in order to protect the component parts from destruction, which additionally means a considerable restriction in the conversion of the setpoint value, can be avoided.

In a preferred embodiment of the invention, the cyclical value is modulated in such a way that a cyclical movement of the rotor of the electric machine results which has an amplitude which is greater than $\frac{1}{6}$ of an electrical revolution. The rotor of the electric machine in this case oscillates with a total peak-to-peak value of preferably more than $\frac{1}{3}$ of an electrical revolution. The mean value of this oscillation is in this case the presently preset setpoint value. By virtue of such a cyclical value, or such an amplitude, an improved distribution of the power losses among the switch branches of the output stages is achieved, with the result that destruction of the component parts can be avoided.

Preferably, the frequency of the cyclical value is selected such that it is in the vicinity of or equal to a natural frequency of the dynamic system, in particular consisting of a machine controller, power electronics, the electric machine and/or a downstream mechanical drive system, with the result that the desired amplitude of the cyclical movement of the rotor position is achieved given a reduced amplitude of the cyclical value. This has the advantage that the system can be escalated easily owing to the natural frequency, with the result that a high efficiency can be achieved with a low level of excitation.

In a further preferred embodiment of the invention, a setpoint torque is used as setpoint value. Alternatively, a setpoint current of a current controller of the electric machine is used as setpoint value. In a further alternative, a setpoint angle of the rotor of the electric machine is used as setpoint value. These values can be measured in a simple manner, with the result that a setpoint value can be compared with the actual value, and therefore a discrepancy can be established in a simple manner.

Advantageously, the reaching of the special state is detected when the rotational frequency of the electrical voltage phasor impressed by the power electronics is less than a limit frequency, and a temperature, a phase current and/or a resultant torque exceeds a threshold value. Within the meaning of the invention, the limit frequency is understood to mean a frequency of the voltage which is impressed by the inverter above which, by one-sided loading of component parts, destruction of these component parts can arise, wherein reaching of the limit frequency alone does not yet result in destruction of component parts. In order to enter a special state, this condition must therefore be present together with the exceeding of a temperature, a temperature difference, a current and/or a torque. The advantage of the detection of the special state consists in that destruction of component parts is avoided.

In an advantageous development, the special state is detected only after a predetermined time period during which the threshold value is exceeded. This means that, when one or more threshold values is exceeded for a short period of time, no special state is detected. A special state is therefore only detected when at least one instance of a threshold value being exceeded lasts for a predetermined time period. With this time period it can be assumed that this results in heating of the switch branches. As a result, unnecessary detection, which is uncritical for the switch branches, of a special state is avoided. Therefore, only the instances of threshold values being exceeded which become critical for the switch branches are detected as special state.

The limit frequency is preferably fixed depending on the thermal properties of the power electronics. As a result, the limit frequency can be better adapted to the power electronics.

In a preferred development of the invention, the leaving of the special state is detected when the rotational frequency of the electrical voltage phasor impressed by the power electronics is greater than the limit frequency. When the special state is left, the rotor of the electric machine begins to rotate again, with the result that one-sided loading and therefore destruction of the component parts can be ruled out. This is detected by a frequency of the electrical voltage impressed by the power electronics which is greater than the limit frequency.

In addition, the invention comprises a closed-loop control device for operating an electric machine, wherein the closed-loop control device is designed to perform the method according to the invention. The closed-loop control device in this case comprises a setpoint value presetting unit, for presetting a setpoint value, a signal conditioner, for the closed-loop control of the electric machine, power electronics, as actuating element for the electric machine, an operating state detection and decision unit, for detecting an operating state and for deciding whether, on the basis of the operating state, the special operating mode or the normal operating mode should be implemented, and a modulation unit, for modulating a cyclical value onto the setpoint value during the special operating mode. With such a closed-loop control device, the advantages described relating to the method can be achieved.

In a preferred embodiment, the electric machine is a synchronous machine. The advantage of a synchronous machine is that it has a high efficiency, a low moment of inertia and, owing to the excitation without slip rings, is relatively low maintenance.

In order to implement the method, the invention comprises a computer program product having program code means for performing the method when the computer program product is stored on a control unit of a closed-loop control device or on a computer-readable data carrier. Furthermore, the invention comprises a machine-readable storage medium, on which the computer program product is stored.

BRIEF DESCRIPTION OF THE DRAWINGS

Exemplary embodiments of the invention are illustrated in the drawings and are explained in more detail in the description below. In the drawings.

DETAILED DESCRIPTION

Figure 1:
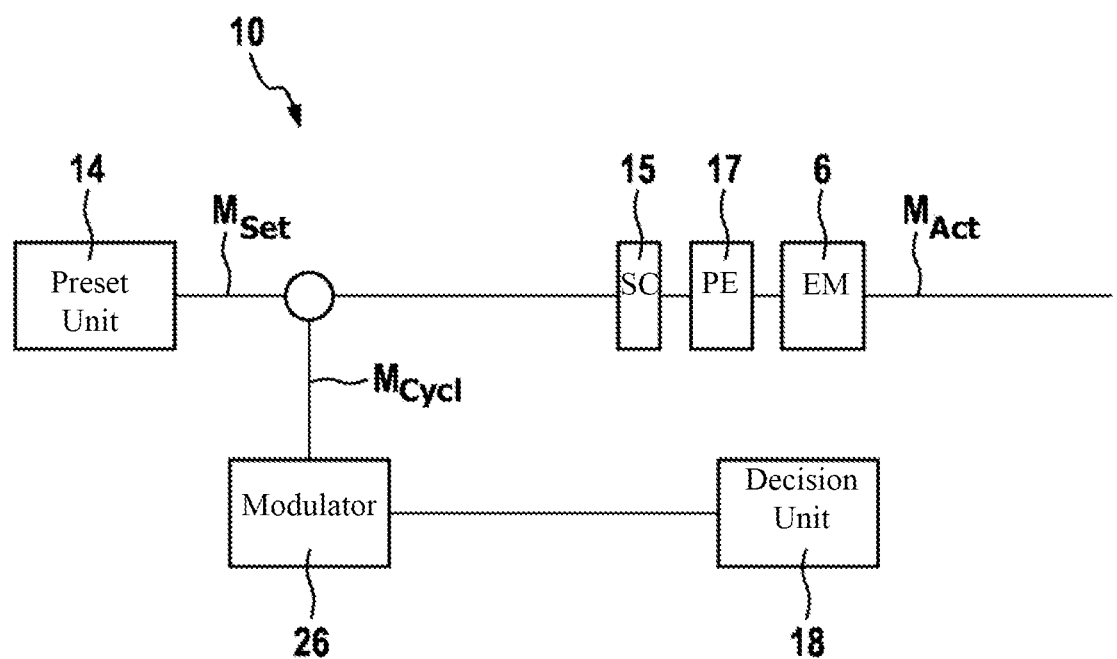
FIG. 1 shows an exemplary embodiment of a method for operating an electric machine and closed-loop control device for performing the method.

FIG. 1 shows an exemplary embodiment of a method for operating an electric machine 6 and a closed-loop control device 10 for performing the method. The closed-loop control device 10 in this case comprises a setpoint value presetting unit 14, which, during a normal operating mode $\psi_{Normal}$, passes on the setpoint value, which in this case is a setpoint torque $M_{Set}$, for example, to a signal conditioner 15, consisting of a machine controller, a transformation into the rotating coordinate system, and a phasor pulse width modulation, which adjusts the torque of the electric machine 6 having power electronics 17 as actuating element to the setpoint value $M_{Set}$. In another exemplary embodiment, the setpoint value can likewise be a setpoint current of a current controller.

The closed-loop control device 10 additionally comprises an operating state detection and decision unit 18, which detects an operating state $M_{Act}$ of the electric machine 6 and the power electronics 17. The operating state detection and decision unit 18 determines the present operating state of the drive, wherein the state variables of the drive are $M_{Act}$ or $M_{Set}$, the position and rotational frequency of the rotor, the temperatures of the switches in the power electronics 17 and possibly further state variables. If the rotational frequency of the electrical voltage phasor impressed by the power electronics 17 falls below a limit frequency and, in addition, the temperature $T_{Limit}$ of the switches of the power electronics 17, a current and/or a torque exceeds a threshold, above a threshold value, the decision unit in the operating state detection and decision unit 18 switches to a special operating mode $\psi_{Special}$.

During the special operating mode $\psi_{Special}$, a modulation unit 26 modulates a cyclical value $M_{Cycl}$ onto the setpoint value $M_{Set}$. Owing to generally sufficiently pronounced elasticities in the drive, the modulated fluctuations in the torque result in cyclical movements of the rotor of the electric machine 6, which result in the switching cycles in the power electronics 17 being more uniformly distributed among the individual component parts. As a result, one-sided thermal loading of the component parts is reduced. The special operating mode $\psi_{Special}$ is left again, and the normal operating mode $\psi_{Normal}$ is implemented again when the decision unit in the operating state detection and decision unit 18 receives the signal that the electrical rotational frequency of the rotor is above the limit frequency.

Figure 2:
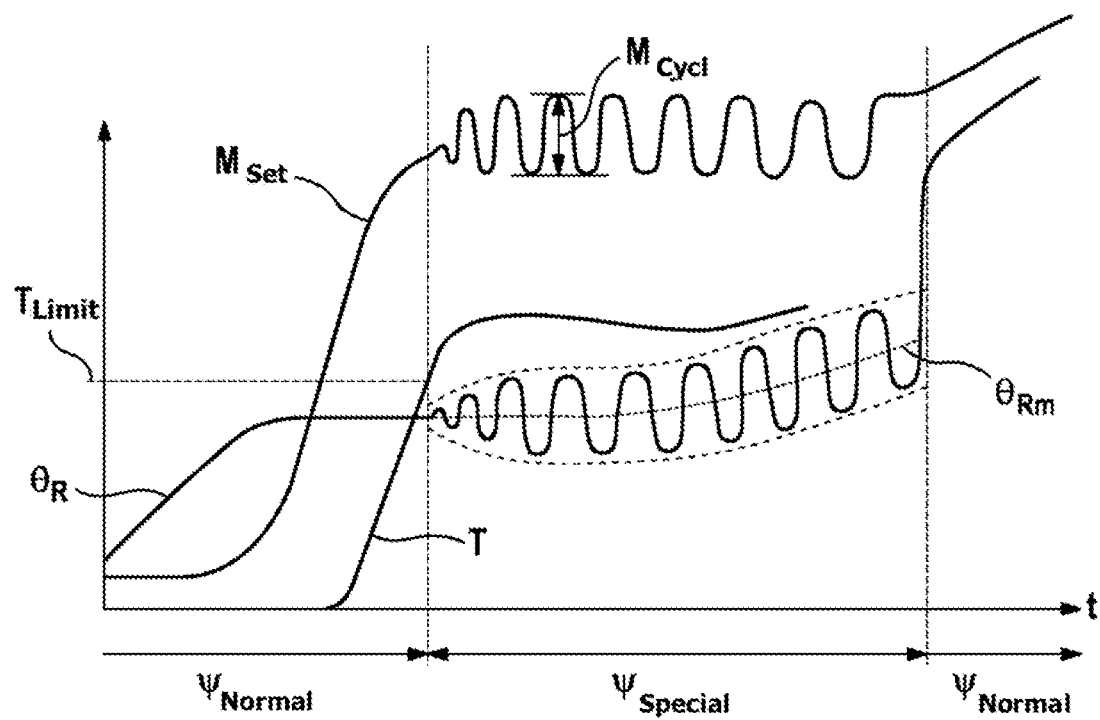
FIG. 2 shows a graph for illustrating an exemplary embodiment of the method according to the invention.

FIG. 2 shows a graph for illustrating an exemplary embodiment of the method according to the invention. In this graph, the setpoint torque $M_{Set}$ is plotted over time t. In addition, a rotor angle $\theta_R$ or the integral of the speed of the rotor is plotted over time t. It can be seen from the two curves that, despite the rise in the setpoint torque $M_{Set}$, the rotor angle $\theta_R$ after an initial rise remains relatively constant at one level.

In addition, the graph shows that a temperature curve T, which shows the temperature in at least one of the switch branches, rises above a limit value $T_{Limit}$. As a result, a special operating mode $\psi_{Special}$ is implemented in which a cyclical value $M_{Cycl}$ is modulated onto the setpoint value $M_{Set}$. This can be seen in FIG. 2 as an oscillation in the setpoint value $M_{Set}$ and oscillation in the rotor angle $\theta_R$. Owing to the oscillation in the rotor angle $\theta_R$, the individual switch branches are subjected to a more uniform load, with the result that a further temperature rise T, as shown in FIG. 2, can be avoided. The temperature T is maintained more or less at a constantly high level.

Owing to the increase in the driver's desired torque, the mean rotor angle $\theta_{Rm}$ increases continuously, which results in the transition to a rotary movement and therefore to the normal operating mode $\psi_{Normal}$. The characteristic illustrated in FIG. 2 is typical for a traction drive of an electric or hybrid vehicle which is initially stationary for a time on an incline, wherein the state of equilibrium is held by the electric drive, and then a vehicle starting operation follows by further depression of the gas pedal.

A further example is a stationary state of the vehicle at an obstacle, for example a curb, in which, by activation of the gas pedal, the wheels first press for a time against the curb and then, by further depression of the gas pedal, a vehicle starting operation takes place in which the obstacle is overcome.

The invention claimed is:

1. A method for operating an electric machine (6), wherein the method comprises a normal operating mode ($\psi_{Normal}$) and a special operating mode ($\psi_{Special}$) depending on a preset setpoint value ($M_{Set}$), and wherein the normal operating mode ($\psi_{Normal}$) comprises the steps of:
    detecting an operating state, wherein when the detected operating state is a special state, the special operating mode ($\psi_{Special}$) is implemented,
    wherein the special operating mode ($\psi_{Special}$) comprises the steps of:
        modulating a cyclical value ($M_{Cycl}$) onto the preset setpoint value ($M_{Set}$),
        detecting the operating state, wherein when the operating state is a normal state, the normal operating mode ($\psi_{Normal}$) is implemented.

2. The method for operating an electric machine (6) as claimed in claim 1, wherein the cyclical value ($M_{Cycl}$) is modulated in such a way that a cyclical movement of the rotor of the electric machine (6) results which has an amplitude which is greater than 1/6 of an electrical revolution.

3. The method for operating an electric machine (6) as claimed in claim 1, wherein the frequency of the cyclical value ($M_{Cycl}$) is selected such that it is in the vicinity of or equal to a natural frequency of a dynamic system that includes a machine controller, power electronics (17), the electric machine (6) and/or a downstream mechanical drive system, with the result that the desired amplitude of the cyclical movement of the rotor position is achieved given a reduced amplitude of the cyclical value ($M_{Cycl}$).

4. The method for operating an electric machine (6) as claimed in claim 1, wherein a setpoint torque ($M_{Set}$) is used as setpoint value.

5. The method for operating an electric machine (6) as claimed in claim 1, wherein a setpoint current of a current controller of the electric machine (6) is used as setpoint value.

6. The method for operating an electric machine (6) as claimed in claim 1, wherein a setpoint angle of the rotor of the electric machine (6) is used as setpoint value.

7. The method for operating an electric machine (6) as claimed in claim 1, wherein the reaching of the special state is detected when the rotational frequency of the electrical voltage phasor impressed by power electronics (17) is less than a limit frequency, and a temperature ($T_{Limit}$), a phase current and/or a resultant torque exceeds a threshold value.

8. The method for operating an electric machine (6) as claimed in claim 7, wherein the special state is detected only after a predetermined time period during which a threshold value is exceeded.

9. The method for operating an electric machine (6) as claimed in claim 7, wherein the limit frequency is fixed depending on the thermal properties of the power electronics (17).

10. The method for operating an electric machine (6) as claimed in claim 7, wherein the leaving of the special state is detected when the rotational frequency of the electrical voltage phasor impressed by the power electronics (17) is greater than the limit frequency.

11. A closed-loop control device (10) for operating an electric machine (6), wherein the closed-loop control device (10) comprises:
    a setpoint value presetting unit (14), for presetting a setpoint value ($M_{Set}$),
    a signal conditioner (15), for the closed-loop control of the electric machine (6),
    power electronics (17) configured as an actuating element for the electric machine (6),
    an operating state detection and decision unit (18), for detecting an operating state and for deciding whether, on the basis of the operating state, a special operating mode ($\psi_{Special}$) or a normal operating mode ($\psi_{Normal}$) should be implemented, and
    a modulation unit (26), for modulating a cyclical value ($M_{Cycl}$) onto the setpoint value ($M_{Set}$) during the special operating mode ($\psi_{Special}$).

12. The closed-loop control device (10) as claimed in claim 11, wherein the electric machine (6) is a synchronous machine.

13. A non-transitory, computer-readable medium containing instructions that when executed by a computer cause the computer to control an electric machine to
    detect an operating state,
        and when the detected operating state is a special state, implement a special operating mode ($\psi_{Special}$) by modulating a cyclical value ($M_{Cycl}$) onto a preset setpoint value ($M_{Set}$),
        and when the detect operating state is a normal state, implement a normal operating mode ($\psi_{Normal}$).

* * * * *